United States Patent
Kwon et al.

(10) Patent No.: US 8,768,073 B2
(45) Date of Patent: Jul. 1, 2014

(54) METHOD, SYSTEM AND COMPUTER PROGRAM PRODUCT FOR CODING A REGION OF INTEREST WITHIN AN IMAGE OF MULTIPLE VIEWS

(75) Inventors: Do-Kyoung Kwon, Allen, TX (US); Madhukar Budagavi, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 38 days.

(21) Appl. No.: 13/540,667

(22) Filed: Jul. 3, 2012

(65) Prior Publication Data

US 2013/0011063 A1      Jan. 10, 2013

Related U.S. Application Data

(60) Provisional application No. 61/504,449, filed on Jul. 5, 2011.

(51) Int. Cl.
*G06K 9/36* (2006.01)

(52) U.S. Cl.
USPC .......................................................... 382/232

(58) Field of Classification Search
USPC .............. 382/154, 173, 232, 251; 375/240.08
See application file for complete search history.

(56) References Cited

U.S. PATENT DOCUMENTS

2003/0095599 A1*   5/2003   Lee et al. ................. 375/240.08
2011/0052045 A1*   3/2011   Kameyama ................... 382/154

\* cited by examiner

*Primary Examiner* — Duy M Dang
(74) *Attorney, Agent, or Firm* — Michael A. Davis, Jr.; Frederick J. Telecky, Jr.

(57) ABSTRACT

For coding at least one region of interest within an image of multiple views, disparities are identified between the multiple views. In response to the disparities, the at least one region of interest is identified. The at least one region of interest is encoded at lower quantization relative to a remainder of the image. The remainder of the image is encoded at higher quantization relative to the at least one region of interest.

27 Claims, 3 Drawing Sheets

METHOD, SYSTEM AND COMPUTER PROGRAM PRODUCT FOR CODING A REGION OF INTEREST WITHIN AN IMAGE OF MULTIPLE VIEWS

CROSS-REFERENCE TO RELATED APPLICATION

This application claims priority to U.S. Provisional Patent Application Ser. No. 61/504,449, filed Jul. 5, 2011, entitled REGION OF INTEREST (ROI) 3D VIDEO CODING BASED ON DEPTH INFORMATION, naming Do-Kyoung Kwon et al. as inventors, which is hereby fully incorporated herein by reference for all purposes.

BACKGROUND

The disclosures herein relate in general to digital image processing, and in particular to a method, system and computer program product for coding a region of interest within an image of multiple views.

Region of interest ("ROI") coding is useful for increasing an encoded image's perceptual quality at relatively low bitrate. For ROI coding, in response to various criteria (e.g., motion and/or texture), an encoder selects an ROI (within the image) to encode at relatively lower quantization. However, if the encoder selects the ROI in response to criteria that fail to accord with a human's interests, then the encoded image's perceptual quality may actually diminish, especially in coding an image of multiple views (e.g., three-dimensional ("3D") video coding). For example, such diminished quality can strain the human's viewing of a corresponding decoded image with 3D effect on a stereoscopic display screen, thereby causing the human's eventual discomfort (e.g., headaches and/or eye muscle pain).

SUMMARY

For coding at least one region of interest within an image of multiple views, disparities are identified between the multiple views. In response to the disparities, the at least one region of interest is identified. The at least one region of interest is encoded at lower quantization relative to a remainder of the image. The remainder of the image is encoded at higher quantization relative to the at least one region of interest.

DETAILED DESCRIPTION

Figure 1:
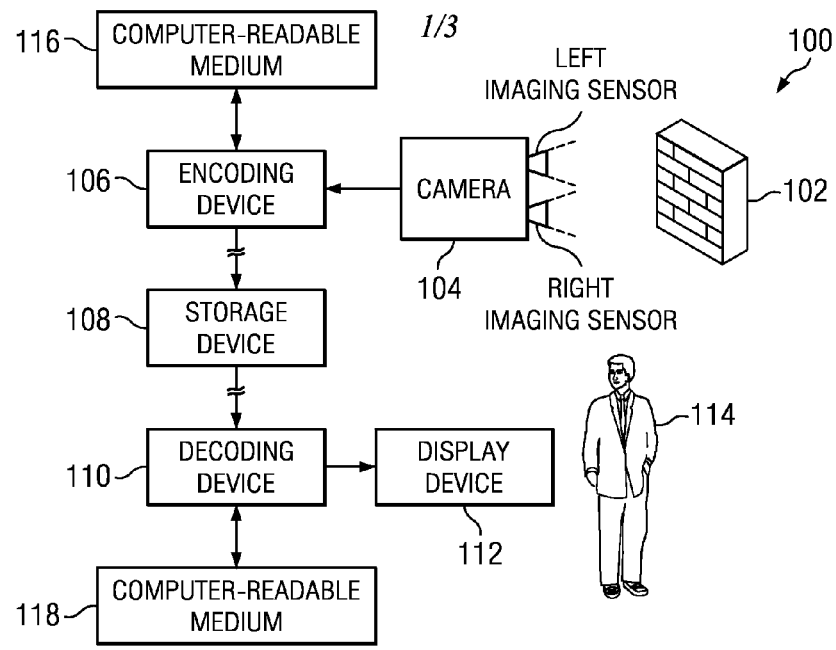
FIG. 1 is a block diagram of an information handling system of the illustrative embodiments.

FIG. 1 is a block diagram of an information handling system (e.g., a portable battery-powered electronics device, such as a mobile smartphone, a tablet computing device, a netbook computer, or a laptop computer), indicated generally at 100, of the illustrative embodiments. In the example of FIG. 1, a scene (e.g., including a physical object 102 and its surrounding foreground and background) is viewed by a camera system 104, which: (a) digitizes images of such views; and (b) outputs a video sequence of such digitized (or "digital") images to an encoding device 106. In the example of FIG. 1, the camera system 104 is a stereoscopic camera system, which includes dual imaging sensors, which are horizontally offset from one another, namely: (a) a left imaging sensor for digitizing and outputting (to the encoding device 106) a left view of an image for viewing by a human's left eye; and (b) a right imaging sensor for digitizing and outputting (to the encoding device 106) a right view of the image for viewing by the human's right eye.

From the camera system 104, the encoding device 106 receives such images. The encoding device 106 encodes such images into a binary logic bit stream. Also, the encoding device 106 outputs the bit stream to a storage device 108, which receives and stores the bit stream.

A decoding device 110 reads the bit stream from the storage device 108. In response to the bit stream, the decoding device 110 decodes the bit stream into such images. Also, the decoding device 110 outputs such images to a display device 112 for display to a human user 114. The display device 112: (a) receives such images from the decoding device 110 (e.g., in response to a command that the user 114 specifies via a touchscreen of the display device 112); and (b) in response thereto, displays such images (e.g., stereoscopic images of the object 102 and its surrounding foreground and background), which are viewable by the user 114.

In the example of FIG. 1, the display device 112 is a stereoscopic display whose optical components enable viewing with 3D effect. In one example, the display device 112 displays such images (e.g., anaglyph images) with 3D effect for viewing by the user 114 through special glasses that: (a) filter the left view against being seen by a right eye of the user 114; and (b) filter the right view against being seen by a left eye of the user 114. In another example, the display device 112 is a stereoscopic 3D liquid crystal display device or a stereoscopic 3D organic electroluminescent display device, which displays such images with 3D effect for viewing by the user 114 without relying on special glasses.

The encoding device 106 performs its operations in response to instructions of a computer-readable program that is stored on a computer-readable medium 116 (e.g., hard disk drive, flash memory card, or other nonvolatile storage device). Also, the computer-readable medium 116 stores a database of information for operations of the encoding device 106. Similarly, the decoding device 110 performs its operations in response to instructions of a computer-readable program that is stored on a computer-readable medium 118. Also, the computer-readable medium 118 stores a database of information for operations of the decoding device 110.

In an alternative embodiment: (a) the encoding device 106 outputs the bit stream directly to the decoding device 110 via a communication channel (e.g., Ethernet, Internet, or wireless communication channel); and (b) accordingly, the decoding device 110 receives and processes the bit stream directly from the encoding device 106 in real-time. In such alternative embodiment, the storage device 108 either: (a) concurrently receives (in parallel with the decoding device 110) and stores the bit stream from the encoding device 106; or (b) is absent from the system 100. The system 100 is formed by electronic circuitry components for performing the system 100 operations, implemented in a suitable combination of software, firmware and hardware, such as one or more digital signal processors ("DSPs"), microprocessors, discrete logic devices, application specific integrated circuits ("ASICs"), and field-programmable gate arrays ("FPGAs").

Figure 2:
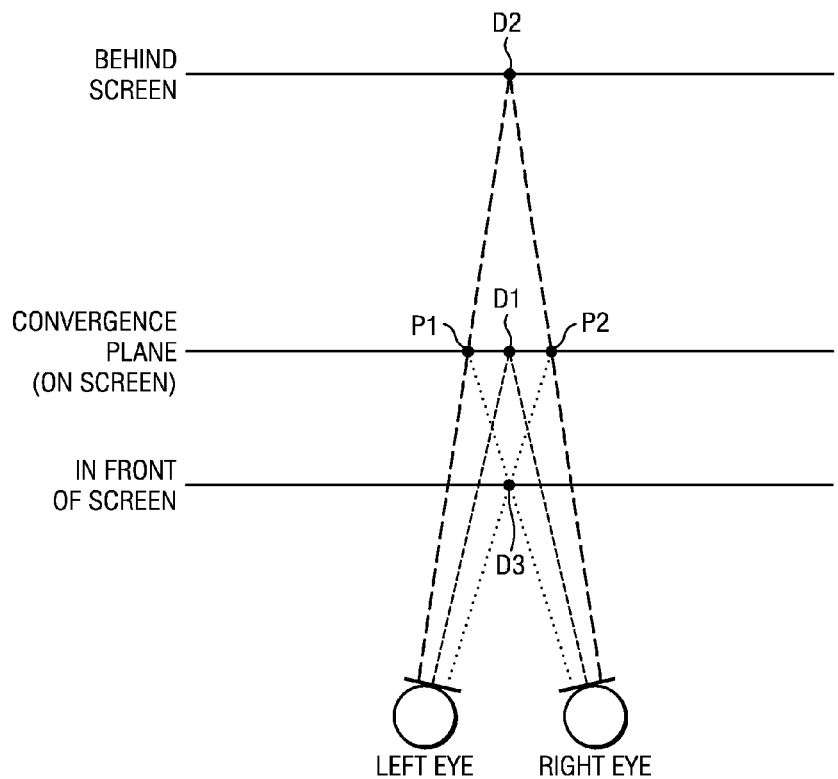
FIG. 2 is a diagram of viewing axes of a human's left and right eyes.

FIG. 2 is a diagram of viewing axes of left and right eyes of the user 114. In the example of FIG. 2, a stereoscopic image is displayed by the display device 112 on a screen (which is a convergence plane where viewing axes of the left and right eyes naturally converge to intersect). The user 114 experiences the 3D effect by viewing the image on the display device 112, so that various features (e.g., objects) appear on the screen (e.g., at a point D1), behind the screen (e.g., at a point D2), and/or in front of the screen (e.g., at a point D3).

Within the stereoscopic image, a feature's disparity is a horizontal shift between: (a) such feature's location within the left view; and (b) such feature's corresponding location within the right view. For example, if a feature (within the stereoscopic image) is horizontally centered on the point D1 within the left view, and likewise horizontally centered on the point D1 within the right view, then: (a) such feature's disparity=D1−D1=0; and (b) the user 114 will perceive the feature to appear at the point D1 with zero horizontal disparity on the screen, which is a natural convergence distance away from the left and right eyes.

By comparison, if the feature is horizontally centered on a point P1 within the left view, and horizontally centered on a point P2 within the right view, then: (a) such feature's disparity=P2−P1; and (b) the user 114 will perceive the feature to appear at the point D2 with positive disparity behind the screen, which is greater than the natural convergence distance away from the left and right eyes. Conversely, if the feature is horizontally centered on the point P2 within the left view and horizontally centered on the point P1 within the right view, then: (a) such feature's disparity=P1−P2; and (b) the user 114 will perceive the feature to appear at the point D3 with negative disparity in front of the screen, which is less than the natural convergence distance away from the left and right eyes. The amount of the feature's disparity (e.g., horizontal shift of the feature from P1 within the left view to P2 within the right view) is measurable as a number of pixels, so that: (a) positive disparity is represented as a positive number; and (b) negative disparity is represented as a negative number.

Figure 3A:
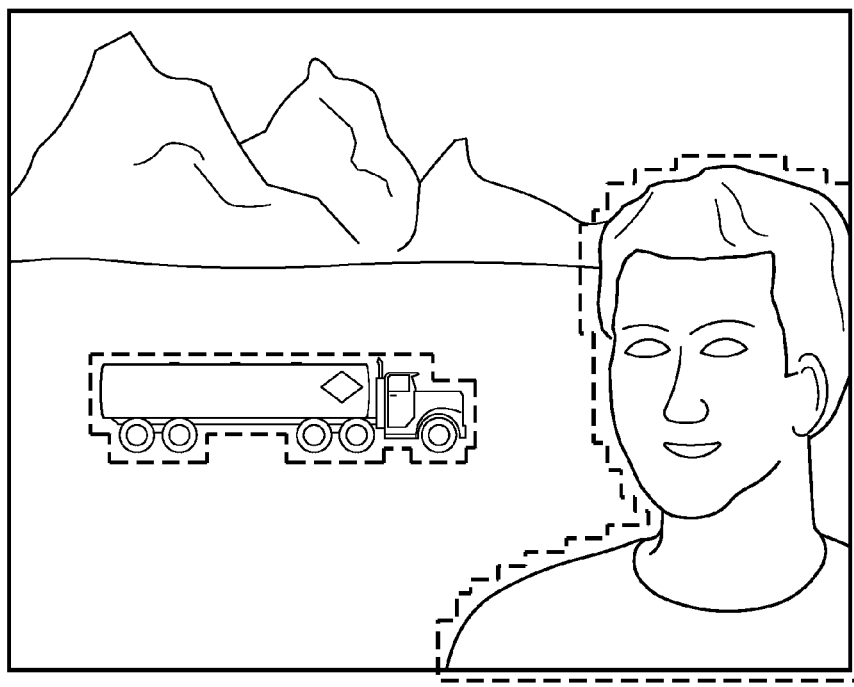
FIG. 3A is a diagram of a left view of an image for viewing by the human's left eye on a display device of the system of FIG. 1.
Figure 3B:
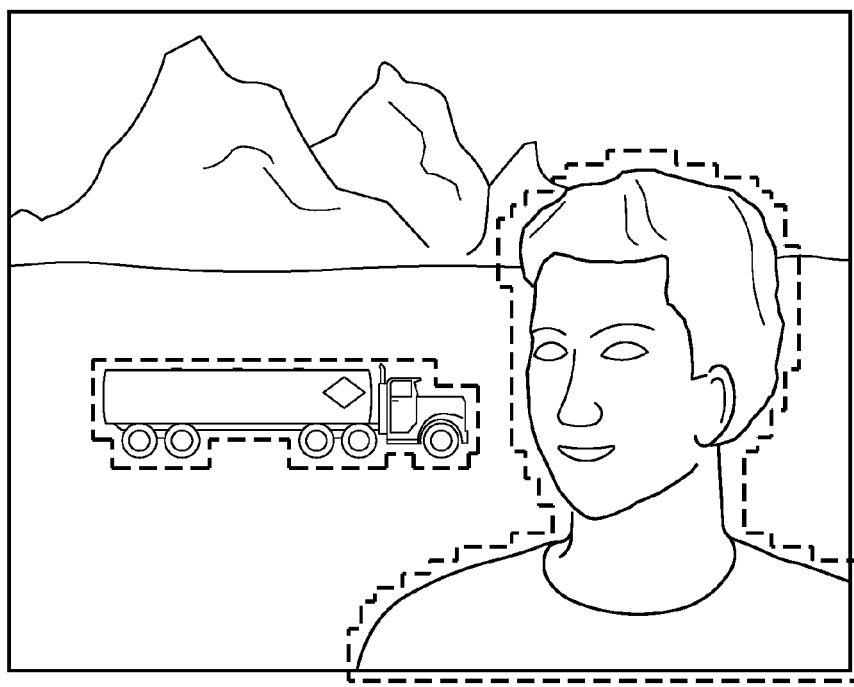
FIG. 3B is a diagram of a right view of the image for viewing by the human's right eye on the display device.

FIG. 3A is a diagram of a left view for viewing by the left eye (of the user 114) on the display device 112. FIG. 3B is a diagram of a right view for viewing by the right eye (of the user 114) on the display device 112. Accordingly, the left view (FIG. 3A) and its associated right view (FIG. 3B) are a matched pair of left and right views, which correspond to one another, and which together form a stereoscopic image for display to the user 114 on the screen of the display device 112.

The matched pair of left and right views are temporally co-located, because they are contemporaneously (e.g., simultaneously) digitized and output (to the encoding device 106) by the left and right imaging sensors, respectively. Portions of the image (e.g., features, such as objects, within the image) include a mountain range, a truck, and a person's face. Because the truck is horizontally centered on the same coordinate in both of the left and right views (of FIGS. 3A and 3B), the user 114 will perceive the truck to appear on the screen, which is a natural convergence distance away from the left and right eyes.

By comparison, the mountain range within the left view of FIG. 3A is left of the mountain range within the right view of FIG. 3B. As discussed hereinabove in connection with FIG. 2, if a feature (e.g., at the point P1 in FIG. 2) within the left view is left of the same feature (e.g., at the point P2 in FIG. 2) within the right view, then the user 114 will perceive such feature to appear behind the screen. Accordingly, the user 114 will perceive the mountain range (of FIGS. 3A and 3B) to appear behind the screen.

Conversely, the person's face within the left view of FIG. 3A is right of the person's face within the right view of FIG. 3B. As discussed hereinabove in connection with FIG. 2, if a feature (e.g., at the point P2 in FIG. 2) within the left view is right of the same feature (e.g., at the point P1 in FIG. 2) within the right view, then the user 114 will perceive such feature to appear in front of the screen. Accordingly, the user 114 will perceive the person's face (of FIGS. 3A and 3B) to appear in front of the screen.

Figure 4:
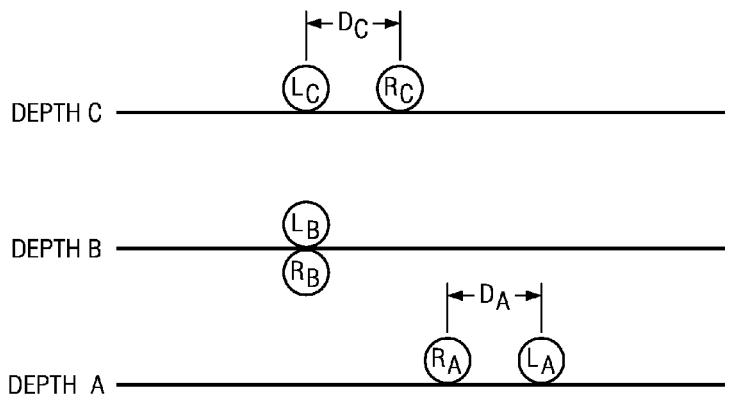
FIG. 4 is a diagram of features at various depths within a stereoscopic image of FIGS. 3A and 3B.

FIG. 4 is a diagram of features at various depths within the stereoscopic image of FIGS. 3A and 3B. Such depths are proportional to disparities of such features. For example, within the image of FIGS. 3A and 3B, features include: (a) the person's face at a depth A, which is horizontally centered on a variable point $L_A$ within the left view (FIG. 3A) and horizontally centered on a variable point $R_A$ within the right view (FIG. 3B), where a disparity $D_A=R_A-L_A<0$ (so the user 114 will perceive the person's face to appear in front of the screen); (b) the truck at a depth B, which is horizontally centered on a variable point $L_B$ within the left view (FIG. 3A) and horizontally centered on a variable point $R_B$ within the right view (FIG. 3B), where a disparity $D_B=R_B-L_B=0$ (so the user 114 will perceive the truck to appear on the screen); and (c) the mountain range at a depth C, which is horizontally centered on a variable point $L_C$ within the left view (FIG. 3A) and horizontally centered on a variable point $R_C$ within the right view (FIG. 3B), where a disparity $D_C=R_C-L_C>0$ (so the user 114 will perceive the mountain range to appear behind the screen).

Accordingly, in the example of FIGS. 3A, 3B and 4, the convergence plane is located at the depth B. As discussed hereinbelow in connection with FIG. 5, per image of multiple views (e.g., stereoscopic image), the encoding device 106 automatically: (a) identifies (e.g., computes by itself, or receives from another source) disparities between the multiple views (e.g., left and right views) of such image, such as respective disparities of features within such image (e.g., disparities as identified from a depth map that assigns suitable depth values to regions within the image); and (b) in response to such disparities, determines one or more regions of interest ("ROIs") within such image.

Figure 5:
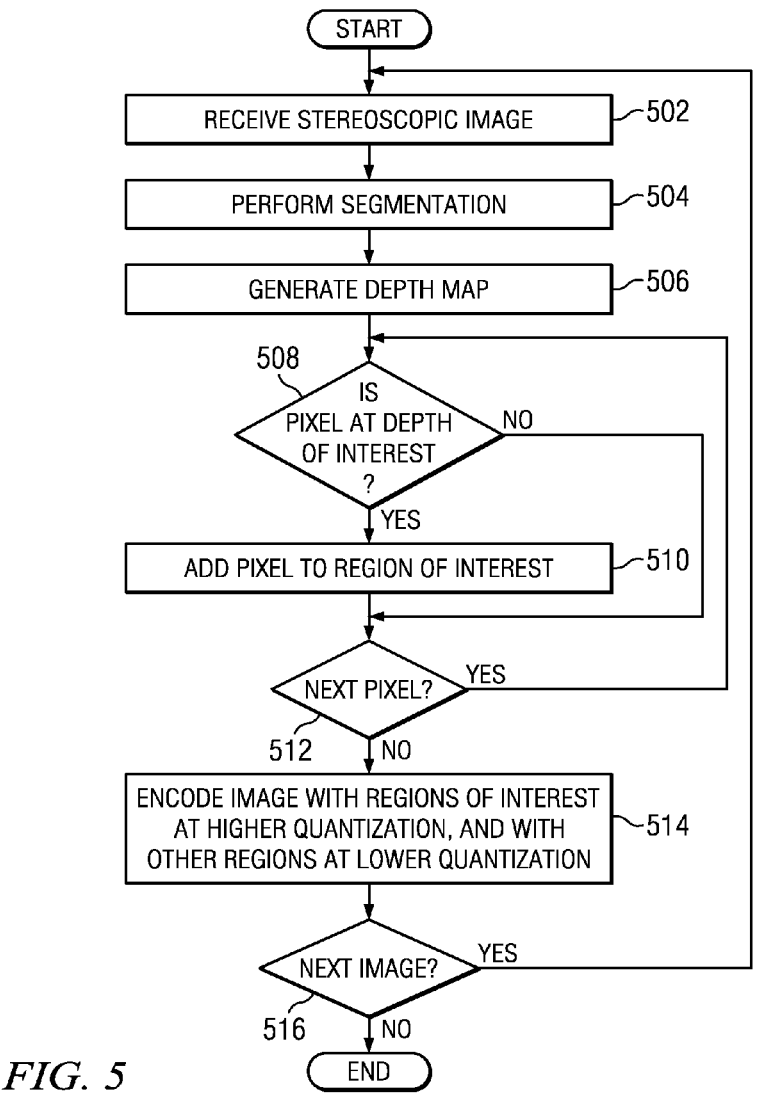
FIG. 5 is a flowchart of operation of an encoding device of the system of FIG. 1.

FIG. 5 is a flowchart of operation of the encoding device 106. The operation begins at a step 502, at which the encoding device 106 receives an image (e.g., a stereoscopic image) from the camera system 104. At a next step 504, in response to the database of information (e.g., training information) from the computer-readable medium 116, the encoding device 106: (a) detects and classifies various low level features (e.g., colors, edges, textures, focus/blur, object sizes, gradients, and positions) and high level features (e.g., faces, bodies, sky, foliage, and other objects) within the image; and (b) performs a mean shift clustering operation to segment the image into regions.

At a next step 506, in response to disparities of such features, and in response to such information from the computer-readable medium 116, the encoding device 106 generates a depth map that assigns suitable depth values to such regions within the image. Each region includes its own group of respective pixels, so that all pixels (within such region) have such region's depth value in the depth map. In an alternative embodiment, the encoding device 106 receives the disparities (e.g., by receiving the depth map) from another source (e.g., from the camera system 104). At a next step 508, in response to a pixel's depth value, the encoding device 106 determines whether such pixel is located at a depth of interest.

In response to the encoding device 106 determining that such pixel is located at a depth of interest, the operation continues from the step 508 to a step 510, at which the encoding device 106 adds such pixel to a list of ROIs. After the step 510, the operation continues to a step 512. Conversely, in response to the encoding device 106 determining that such pixel is not located at a depth of interest, the operation continues from the step 508 to the step 512.

At the step 512, the encoding device 106 determines whether a next pixel (within the image) remains to be evaluated for possible addition to the list of ROIs. In response to the encoding device 106 determining that a next pixel (within the image) remains to be so evaluated, the operation returns from the step 512 to the step 508 for evaluation of such next pixel. Conversely, in response to the encoding device 106 determining that a next pixel (within the image) does not remain to be so evaluated, the operation continues from the step 512 to a step 514.

At the step 514, the encoding device 106 automatically encodes the image, so that: (a) if a macroblock ("MB") includes one or more pixels in the list of ROIs, then an entirety of such MB is encoded at relatively lower (e.g., more fine) quantization; and (b) a remainder of the image is encoded at relatively higher (e.g., more course) quantization. After the step 514, the operation continues to a step 516, at which the encoding device 106 determines whether a next image remains to be encoded. In response to the encoding device 106 determining that a next image remains to be encoded, the operation returns from the step 516 to the step 502 for encoding of such next image. Conversely, in response to the encoding device 106 determining that a next image does not remain to be encoded, the operation ends.

By encoding at relatively lower quantization for the entirety of MBs that include one or more pixels in the list of ROIs, the encoding device 106 increases perceptual quality of such MBs. By encoding at relatively higher quantization for the remainder of the image, the encoding device 106 achieves a relatively low bitrate for efficiency. The encoding device 106 encodes each MB's respective quantization parameter ("QP") into the bit stream, so that the decoding device 110 receives the QPs and decodes the MBs accordingly. In one embodiment, QP is an integer within a range of $0 \leq QP \leq 51$. A lower QP indicates relatively lower quantization, and a higher QP indicates relatively higher quantization.

The depth(s) of interest accord with interests (e.g., natural focus) of the user 114. For example, within a stereoscopic image, a pixel's depth is proportional to such pixel's disparity between: (a) such pixel's location within the left view; and (b) such pixel's corresponding location within the right view. Accordingly, in one embodiment, the encoding device 106 determines whether a pixel is located at a depth of interest by determining whether such pixel's disparity $d(x, y)$ is not greater than a threshold dTH.

In a first example, dTH is 0, so the encoding device 106 determines that a pixel is located at a depth of interest in response to determining that such pixel's disparity $d(x, y)$ is zero or negative (e.g., if the user 114 naturally focuses upon objects that appear on the screen or in front of the screen). In FIGS. 3A and 3B, the truck and the person's face have disparities that are zero or negative. Accordingly, in the first example: (a) the truck and the person's face are ROIs, which are outlined by dashed enclosures in FIGS. 3A and 3B for illustrative purposes; and (b) the encoding device 106 encodes MBs of such ROIs at relatively lower quantization.

In a second example, dTH is a positive number. In a third example, dTH is a negative number. In a fourth example, dTH is an image's average disparity dAVG (e.g., if the image's disparities are all positive, or if the image's disparities are all negative). In a fifth example, dTH =dAVG +C, where C is a predetermined non-zero constant (e.g., a negative number).

In another embodiment (e.g., for a security monitoring system), the encoding device 106 determines whether a pixel is located at a depth of interest by determining whether such pixel's disparity $d(x, y)$ is within one or more ranges of disparity. In one example, the encoding device 106 determines that a pixel is located at a depth of interest in response to determining that such pixel's disparity $d(x, y)$ is within either: (a) a first range of $dTHlow_1 \leq d(x, y) \leq dTHhigh_1$; (b) a second range of $dTHlow_2 \leq d(x, y) \leq dTHhigh_2$; or (c) a third range of $dTHlow_3 \leq d(x, y) \leq dTHhigh_3$. In yet another alternative embodiment, the encoding device 106 determines whether a pixel is located at a depth of interest by determining: (a) whether such pixel's disparity $d(x, y)$ satisfies a disparity condition (e.g., equal to or less than dTH, or within a range of disparity); and (b) whether such pixel satisfies at least one additional criterion (e.g., color and/or position of such pixel).

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof Although illustrative embodiments have been shown and described by way of example, a wide range of alternative embodiments is possible within the scope of the foregoing disclosure.

What is claimed is:

1. A method performed by an information handling system for coding at least one region of interest within an image of multiple views, the method comprising:
   in response to the image, identifying disparities between the multiple views;
   in response to the disparities, identifying the at least one region of interest;
   encoding the at least one region of interest at lower quantization relative to a remainder of the image; and
   encoding the remainder of the image at higher quantization relative to the at least one region of interest;
   wherein identifying the at least one region of interest includes: in response to a disparity of a pixel between the multiple views, determining whether the pixel is located at a depth of interest; and, in response to the pixel being located at the depth of interest, identifying the at least one region of interest to include an entirety of a macroblock in which the pixel is located.

2. The method of claim 1, and comprising:
   for macroblocks of the image, encoding respective quantization parameters to indicate relative quantizations of the macroblocks.

3. The method of claim 1, wherein determining whether the pixel is located at the depth of interest includes:
   in response to the disparity of the pixel, and in response to whether the pixel satisfies at least one additional criterion, determining whether the pixel is located at the depth of interest.

4. The method of claim 1, wherein determining whether the pixel is located at the depth of interest includes:
   determining whether the disparity of the pixel is within one or more ranges of disparity.

5. The method of claim 1, wherein determining whether the pixel is located at the depth of interest includes:
   determining whether the disparity of the pixel is not greater than a threshold.

6. The method of claim 5, wherein the threshold is zero, and wherein determining whether the pixel is located at the depth of interest includes:
   in response to determining that the disparity of the pixel is not greater than the threshold, determining that the pixel is located at the depth of interest.

7. The method of claim 5, wherein the threshold is an average of respective disparities of pixels between the multiple views, and wherein determining whether the pixel is located at the depth of interest includes:
   in response to determining that the disparity of the pixel is not greater than the threshold, determining that the pixel is located at the depth of interest.

8. The method of claim 5, wherein the threshold is a sum of: a predetermined non-zero constant; and an average of respective disparities of pixels between the multiple views, and wherein determining whether the pixel is located at the depth of interest includes:
   in response to determining that the disparity of the pixel is not greater than the threshold, determining that the pixel is located at the depth of interest.

9. The method of claim 1, wherein the image is a stereoscopic image.

10. A system for coding at least one region of interest within an image of multiple views, the system comprising:
    at least one device for: in response to the image, identifying disparities between the multiple views; in response to the disparities, identifying the at least one region of interest encoding the at least one region of interest at lower quantization relative to a remainder of the image; and encoding the remainder of the image at higher quantization relative to the at least one region of interest;
    wherein identifying the at least one region of interest includes: in response to a disparity of a pixel between the multiple views, determining whether the pixel is located at a depth of interest; and, in response to the pixel being located at the depth of interest, identifying the at least one region of interest to include an entirety of a macroblock in which the pixel is located.

11. The system of claim 10, wherein the at least one device is for: for macroblocks of the image, encoding respective quantization parameters to indicate relative quantizations of the macroblocks.

12. The system of claim 10, wherein determining whether the pixel is located at the depth of interest includes:
    in response to the disparity of the pixel, and in response to whether the pixel satisfies at least one additional criterion, determining whether the pixel is located at the depth of interest.

13. The system of claim 10, wherein determining whether the pixel is located at the depth of interest includes:
    determining whether the disparity of the pixel is within one or more ranges of disparity.

14. The system of claim 10, wherein determining whether the pixel is located at the depth of interest includes:
    determining whether the disparity of the pixel is not greater than a threshold.

15. The system of claim 14, wherein the threshold is zero, and wherein determining whether the pixel is located at the depth of interest includes:
    in response to determining that the disparity of the pixel is not greater than the threshold, determining that the pixel is located at the depth of interest.

16. The system of claim 14, wherein the threshold is an average of respective disparities of pixels between the multiple views, and wherein determining whether the pixel is located at the depth of interest includes:
    in response to determining that the disparity of the pixel is not greater than the threshold, determining that the pixel is located at the depth of interest.

17. The system of claim 14, wherein the threshold is a sum of: a predetermined non-zero constant; and an average of respective disparities of pixels between the multiple views, and wherein determining whether the pixel is located at the depth of interest includes:
    in response to determining that the disparity of the pixel is not greater than the threshold, determining that the pixel is located at the depth of interest.

18. The system of claim 10, wherein the image is a stereoscopic image.

19. A computer program product for coding at least one region of interest within an image of multiple views, the computer program product comprising:
    a non-transitory computer-readable storage medium; and
    a computer-readable program stored on the non-transitory computer-readable storage medium, wherein the computer-readable program is processable by an information handling system for causing the information handling system to perform operations including: in response to the image, identifying disparities between the multiple views; in response to the disparities, identifying the at least one region of interest; encoding the at least one region of interest at lower quantization relative to a remainder of the image; and encoding the remainder of the image at higher quantization relative to the at least one region of interest;

wherein identifying the at least one region of interest includes: in response to a disparity of a pixel between the multiple views, determining whether the pixel is located at a depth of interest; and, in response to the pixel being located at the depth of interest, identifying the at least one region of interest to include an entirety of a macroblock in which the pixel is located.

20. The computer program product of claim 19, wherein the operations include: for macroblocks of the image, encoding respective quantization parameters to indicate relative quantizations of the macroblocks.

21. The computer program product of claim 19, wherein determining whether the pixel is located at the depth of interest includes:

in response to the disparity of the pixel, and in response to whether the pixel satisfies at least one additional criterion, determining whether the pixel is located at the depth of interest.

22. The computer program product of claim 19, wherein determining whether the pixel is located at the depth of interest includes:

determining whether the disparity of the pixel is within one or more ranges of disparity.

23. The computer program product of claim 19, wherein determining whether the pixel is located at the depth of interest includes:

determining whether the disparity of the pixel is not greater than a threshold.

24. The computer program product of claim 23, wherein the threshold is zero, and wherein determining whether the pixel is located at the depth of interest includes:

in response to determining that the disparity of the pixel is not greater than the threshold, determining that the pixel is located at the depth of interest.

25. The computer program product of claim 23, wherein the threshold is an average of respective disparities of pixels between the multiple views, and wherein determining whether the pixel is located at the depth of interest includes:

in response to determining that the disparity of the pixel is not greater than the threshold, determining that the pixel is located at the depth of interest.

26. The computer program product of claim 23, wherein the threshold is a sum of: a predetermined non-zero constant; and an average of respective disparities of pixels between the multiple views, and wherein determining whether the pixel is located at the depth of interest includes:

in response to determining that the disparity of the pixel is not greater than the threshold, determining that the pixel is located at the depth of interest.

27. The computer program product of claim 19, wherein the image is a stereoscopic image.

* * * * *